(12) United States Patent
Vu et al.

(10) Patent No.: US 7,492,393 B2
(45) Date of Patent: Feb. 17, 2009

(54) METHOD OF AND APPARATUS FOR GENERATING A PRECISE FRAME RATE IN DIGITAL VIDEO TRANSMISSION FROM A COMPUTER SYSTEM TO A DIGITAL VIDEO DEVICE

(75) Inventors: Quan A. Vu, Milpitas, CA (US); Hisato Shima, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1494 days.

(21) Appl. No.: 09/249,642

(22) Filed: Feb. 12, 1999

(65) Prior Publication Data
US 2002/0021358 A1    Feb. 21, 2002

(51) Int. Cl.
*H04N 5/228* (2006.01)
(52) U.S. Cl. .................................... 348/222.1
(58) Field of Classification Search ................. 348/222, 348/552, 19, 14.12, 14.11, 14.15
See application file for complete search history.

(56) References Cited

U.S. PATENT DOCUMENTS 4,713,702 A    12/1987 Ishihara et al. ................. 360/79

(Continued)

FOREIGN PATENT DOCUMENTS

EP    0 428 111 A2    5/1991

OTHER PUBLICATIONS

Teener, M., "A Bus on a Diet—The Serial Bus Alternative: An Introduction to the P1394 High Performance Serial Bus,". Apple Computer Inc, Santa Clara, CA, Doc. No. XP000340753, 1992 IEEE.

(Continued)

*Primary Examiner*—Justin P Misleh
(74) *Attorney, Agent, or Firm*—Haverstock & Owens LLP (57) ABSTRACT

A method of and apparatus for transmitting an isochronous video stream of data at a desired frame rate from a source device to a receiving device. A video frame is part of an isochronous stream of video data which is transmitted over an IEEE 1394-1995 serial bus network. The desired frame rate is determined by the receiving device. The source device preferably determines a proper ratio of data packets versus video frames in response to the particular frame rate required and a cycle time for isochronous data. This ratio of data packets versus video frames rarely computes to an integer result. Accordingly, the source device preferably generates two groups of frames. A first group contains an integer value of packets nearest to and above the desired overall average ratio of data packets versus video frames. The source device generates a second group of frames where each frame from this second group contains an integer value of packets nearest to and below the ratio of packets versus video frames. To achieve the desired frame rate, the source device generates a frame ratio containing a specific number of frames from the first group and the second group and forms the isochronous stream of video data. The source device serially generates each of the frames in an order including a combination of the first group of frames and the second group of frames to achieve the overall desired average frame ratio. The source device then transmits the resulting isochronous video stream of data to the receiving device at the desired frame rate.

30 Claims, 6 Drawing Sheets

U.S. PATENT DOCUMENTS

| | | | |
|---|---|---|---|
| 5,128,677 A | 7/1992 | Donovan et al. | 341/177 |
| 5,400,340 A | 3/1995 | Hillman et al. | 370/105.3 |
| 5,402,419 A | 3/1995 | Osakabe et al. | 370/85.1 |
| 5,412,698 A | 5/1995 | Van Brunt et al. | 375/373 |
| 5,434,860 A | 7/1995 | Riddle | 370/84 |
| 5,444,709 A | 8/1995 | Riddle | 370/94.1 |
| 5,493,570 A | 2/1996 | Hillman et al. | 370/105.3 |
| 5,546,389 A | 8/1996 | Wippenbeck et al. | 370/60 |
| 5,594,734 A | 1/1997 | Worsley et al. | 370/395 |
| 5,596,581 A | 1/1997 | Saeijs et al. | 370/394 |
| 5,598,415 A | 1/1997 | Nuber et al. | 370/474 |
| 5,602,841 A | 2/1997 | Lebizay et al. | 370/413 |
| 5,621,725 A | 4/1997 | Kawamura et al. | 370/43 |
| 5,668,811 A | 9/1997 | Worsley et al. | 370/424 |
| 5,710,773 A | 1/1998 | Shiga | 370/512 |
| 5,781,599 A | 7/1998 | Shiga | 375/376 |
| 5,841,471 A * | 11/1998 | Endsley et al. | 348/231 |
| 5,969,750 A * | 10/1999 | Hsieh et al. | 348/17 |
| 5,982,416 A * | 11/1999 | Ishii et al. | 348/29 |
| 6,006,286 A * | 12/1999 | Baker et al. | 710/22 |
| 6,034,733 A * | 3/2000 | Balram et al. | 348/448 |
| 6,081,841 A * | 6/2000 | Malik | 709/227 |
| 6,144,411 A * | 11/2000 | Kobayashi et al. | 348/441 |
| 6,148,136 A * | 11/2000 | Tanaka et al. | 348/441 |
| 6,373,821 B2 * | 4/2002 | Staats | 348/513 |

OTHER PUBLICATIONS

"Architecture for High Performance Transparent Bridges," Software Patent Institute Database of Software Technologies, Record 10, Serial No. TDB0792.0100, Jul. 1992.

"Data Link Driver Program Design for the IBM Token Ring Network PC Adapter," Computer Communications, pp. 266-272, No. 5, Oct. 12, 1989, GB.

Bloks, R.H.J, "The IEEE-1394 High Speed Serial Bus," Philips Journal of Research, 'pp. 209-216, vol. 50, No. 1/2, 1996.

* cited by examiner

METHOD OF AND APPARATUS FOR GENERATING A PRECISE FRAME RATE IN DIGITAL VIDEO TRANSMISSION FROM A COMPUTER SYSTEM TO A DIGITAL VIDEO DEVICE

FIELD OF THE INVENTION

The present invention relates to the field of transmitting information between devices. More particularly, the present invention relates to the field of transmitting time sensitive information between devices over an IEEE 1394-1995 serial bus network.

BACKGROUND OF THE INVENTION

The IEEE 1394-1995 standard, "1394-1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple channels for isochronous data transfer between applications. A six bit channel number is broadcast with the data to ensure reception by the appropriate application. This allows multiple applications to concurrently transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394-1995 cable environment is a network of nodes connected by point-to-point links, including a port on each node's physical connection and the cable between them. The physical topology for the cable environment of an IEEE 1394-1995 serial bus is a non-cyclic network of multiple ports, with finite branches. The primary restriction on the cable environment is that nodes must be connected together without forming any closed loops.

The IEEE 1394-1995 cables connect ports together on different nodes. Each port includes terminators, transceivers and simple logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394-1995 serial bus. Using these components, the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

Figure 1:
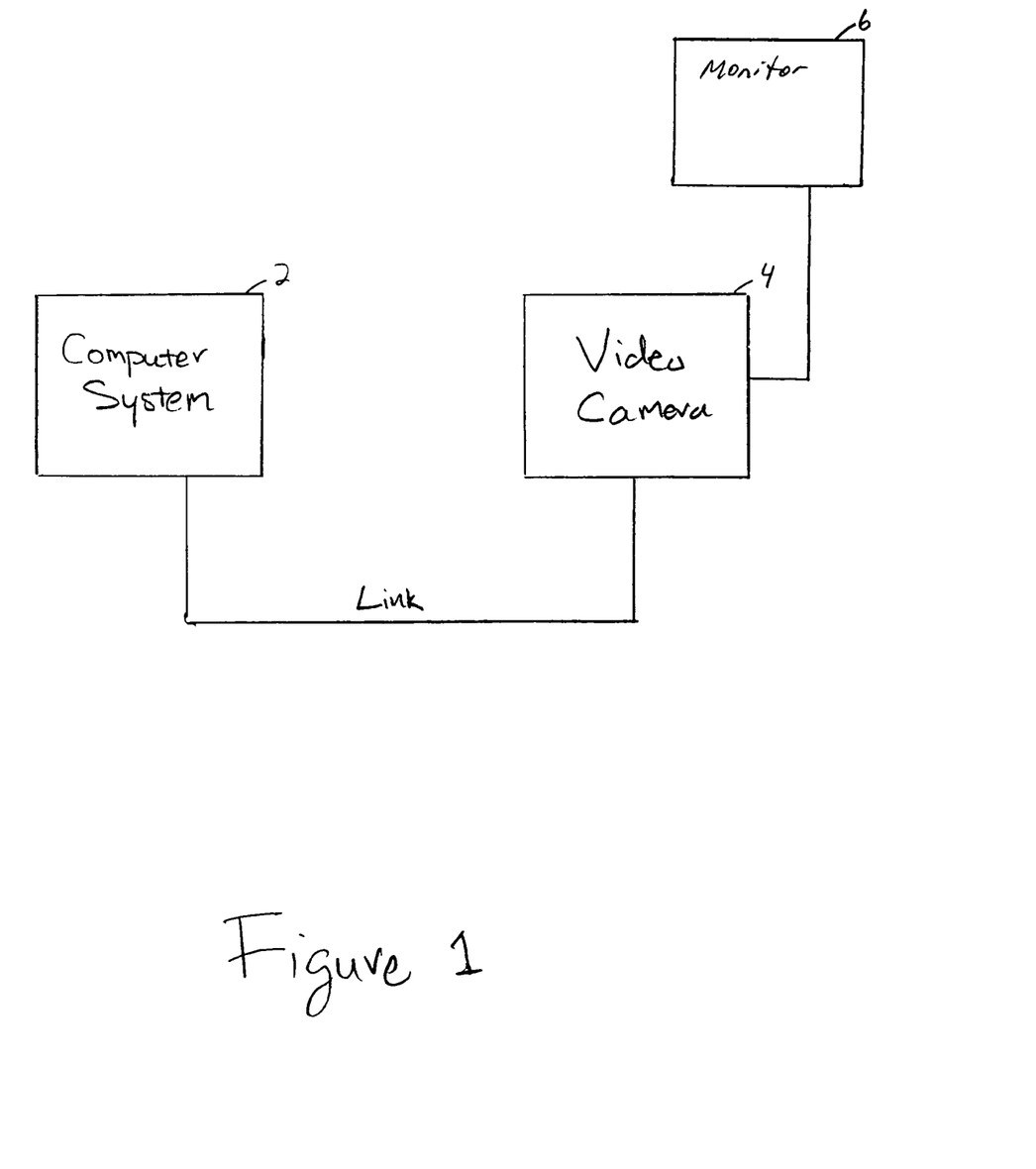
FIG. 1 illustrates a block diagram of a prior art network including a computer system, a video camera, and a monitor.

A block diagram of a video network including a computer system, a video camera, and a monitor is illustrated in FIG. 1. The computer system 2 is coupled to the video camera 4. The video camera 4 is also coupled to the monitor 6. The computer system 2 is capable of transmitting a stream of video data to the video camera 4 for recording by the video camera 4 and/or display on the monitor 6. When the computer system 2 transmits a stream of video data to the digital video camera 4 for display on the monitor 6, the data is forwarded from the video camera 4 to the monitor 6. The monitor 6 receives the stream of video data from the digital video camera 4 and displays a corresponding image in response to the stream of video data. A frame rate is a number of video frames to be displayed per second. To properly display the video images, the monitor 6 typically requires that the stream of video data is transmitted from the video camera 4 at a required frame rate. If the monitor 6 does not receive the stream of video data from the video camera 4 at the required frame rate the quality of the displayed images will suffer, causing color images to be displayed in black and white and other deteriorations of image quality.

SUMMARY OF THE INVENTION

The present invention provides a method of and apparatus for transmitting an isochronous video stream of data at a particular frame rate from a source device to a receiving device. Preferably, a video frame is part of an isochronous stream of video data which is transmitted over an IEEE 1394-1995 serial bus network. The particular, desired frame rate is determined by the receiving device. The source device preferably determines a proper ratio of data packets versus video frames in response to the particular frame rate required and a cycle time for isochronous data. This proper ratio of data packets versus video frames rarely computes to an integer result. Accordingly, once the proper ratio of data packets versus video frames is determined, the source device preferably generates two groups of frames. A first group contains an integer value of packets nearest to and above the desired overall average ratio of data packets versus video frames. The source device also generates a second group of frames where each frame from this second group contains an integer value of packets nearest to and below the ratio of packets versus video frames. In order to achieve the desired frame rate, the source device generates a frame ratio containing a specific number of frames from the first group and the second group and forms the isochronous stream of video data. Further, the source device serially generates each of the frames in an order including a combination of the first group of frames and the second group of frames to achieve the overall desired average frame ratio. The source device then transmits the resulting isochronous video stream of data to the receiving device at the desired frame rate.

DETAILED DESCRIPTION OF THE PREFERRED EMBODIMENT

Figure 2:
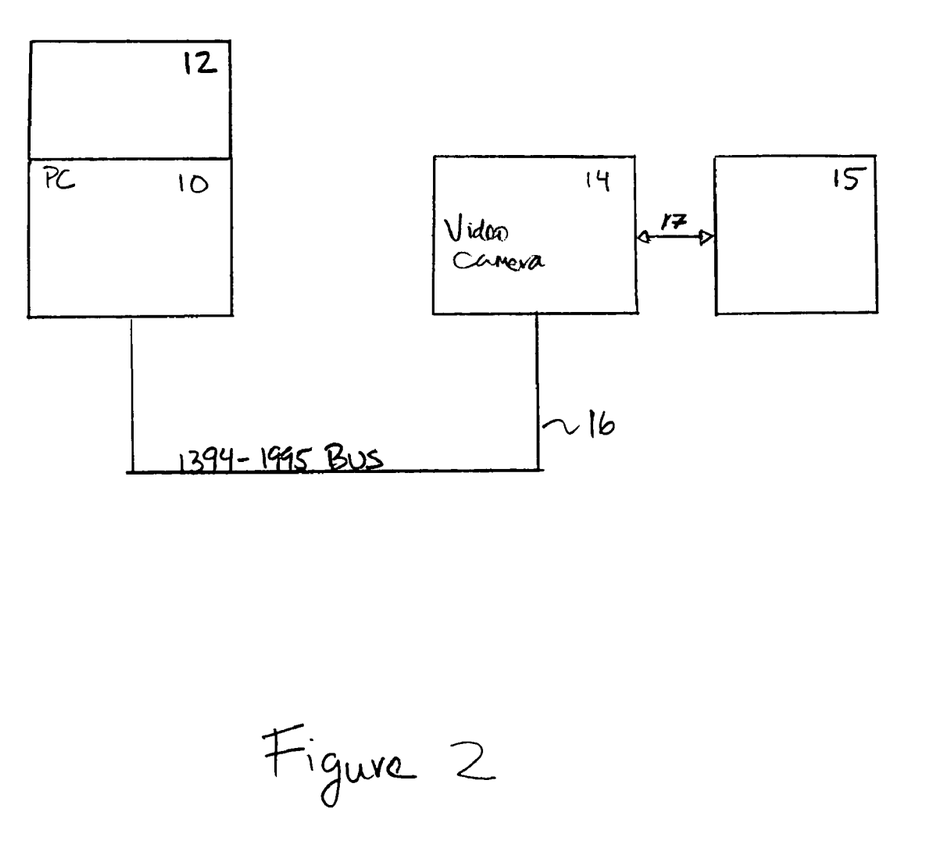
FIG. 2 illustrates a block diagram of an IEEE 1394-1995 serial bus network including a computer system, a video camera, and a monitor.

A block diagram of an exemplary IEEE 1394-1995 serial bus network including a computer system, a video camera, and a monitor is illustrated in FIG. 2. The computer system 10 includes an associated display 12 and is coupled to the video camera 14 by the IEEE 1394-1995 serial bus cable 16. The monitor 15 is coupled to the video camera 14 by a red, green, and blue (RGB) cable 17. Video data and associated data are sent between the video camera 14 and the computer system 10 over the IEEE 1394-1995 serial bus cable 16. Additionally, video data and its associated data are sent between the video camera 14 and the monitor 15 over the RGB cable 17.

In operation, the monitor 15 displays a series of video images provided from the video camera 14 which relate to the video data and corresponding data which are received by the video camera 14 and forwarded to the monitor 15 via the RGB cable 17. The monitor 15 requires that the video data and corresponding data be formatted for a specific frame rate in order for the related video images to be properly displayed. If the monitor does not receive the stream of video data at the correct frame rate, the video quality presented by the monitor 15 will be effected, potentially causing the monitor 15 to display color images in black and white and also effecting the clarity and quality of the displayed images. In this preferred embodiment, the monitor 15 must receive the video data and corresponding data at a frame rate of 29.9700 frames per second. If the monitor 15 does not receive this data at the frame rate of exactly 29.9700 frames per second, the resulting video images will be displayed by the monitor 15 in black and white instead of color. In alternate embodiments, the frame rate required by the monitor 15 is different.

Figure 3:
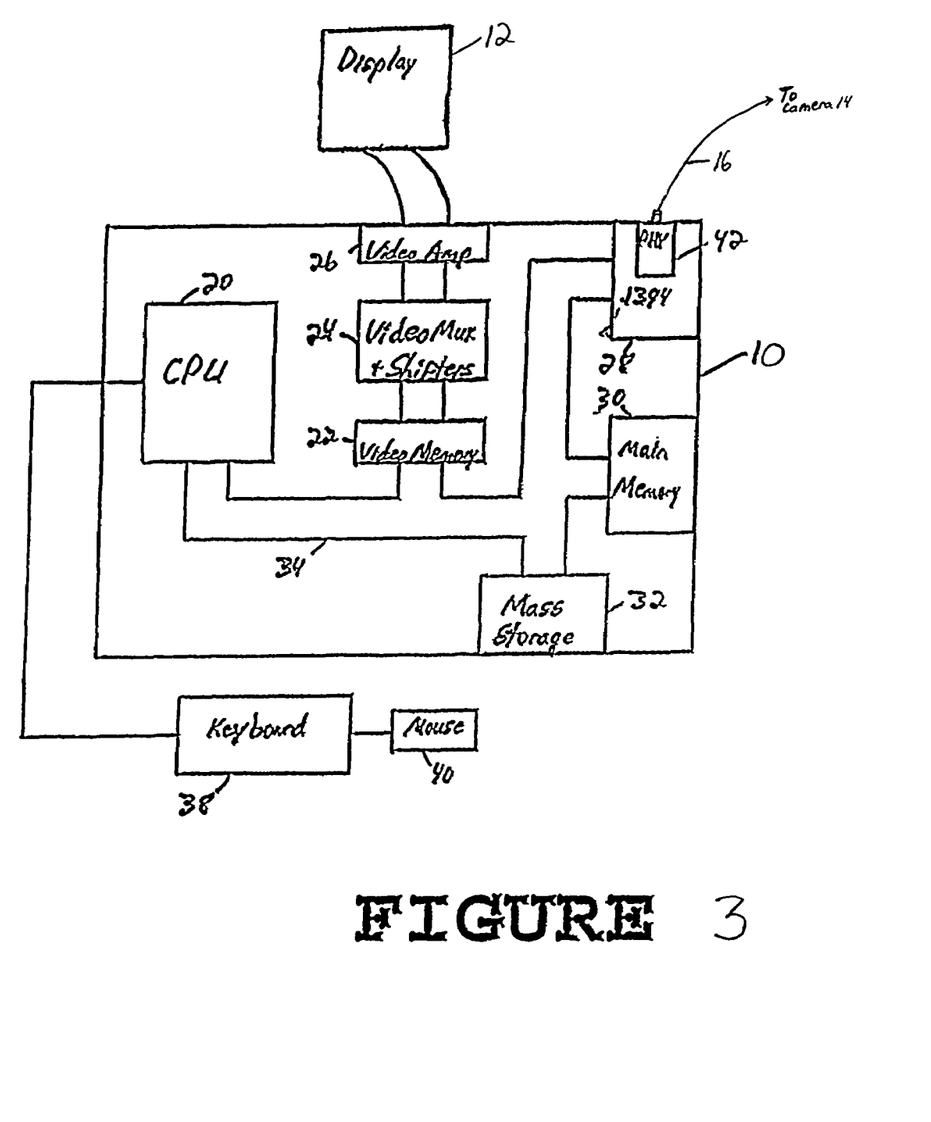
FIG. 3 illustrates a block diagram of the internal components of the computer system.

A block diagram of the internal components of the computer system 10 is illustrated in FIG. 3. The computer system 10 includes a central processor unit (CPU) 20, a main memory 30, a video memory 22, a mass storage device 32 and an IEEE 1394-1995 interface circuit 28, all coupled together by a conventional bidirectional system bus 34. The interface circuit 28 includes the physical interface circuit 42 for sending and receiving communications on the IEEE 1394-1995 serial bus 16. The physical interface circuit 42 is coupled to the camera 14 over the IEEE 1394-1995 serial bus 16. In the preferred embodiment of the present invention, the interface circuit 28 is implemented on an IEEE 1394-1995 interface card within the computer system 10. However, it should be apparent to those skilled in the art that the interface circuit 28 can be implemented within the computer system 10 in any other appropriate manner, including building the interface circuit onto the motherboard itself. The mass storage device 32 may include both fixed and removable media using any one or more of magnetic, optical or magneto-optical storage technology or any other available mass storage technology. The system bus 34 contains an address bus for addressing any portion of the memory 22 and 30. The system bus 34 also includes a data bus for transferring data between and among the CPU 20, the main memory 30, the video memory 22, the mass storage device 32 and the interface circuit 28.

The computer system 10 is also coupled to a number of peripheral input and output devices including the keyboard 38, the mouse 40 and the associated display 12. The keyboard 38 is coupled to the CPU 20 for allowing a user to input data and control commands into the computer system 10. A conventional mouse 40 is coupled to the keyboard 38 for manipulating graphic images on the display 12 as a cursor control device.

A port of the video memory 22 is coupled to a video multiplex and shifter circuit 24, which in turn is coupled to a video amplifier 26. The video amplifier 26 drives the display 12. The video multiplex and shifter circuitry 24 and the video amplifier 26 convert pixel data stored in the video memory 22 to raster signals suitable for use by the display 12.

Figure 4:
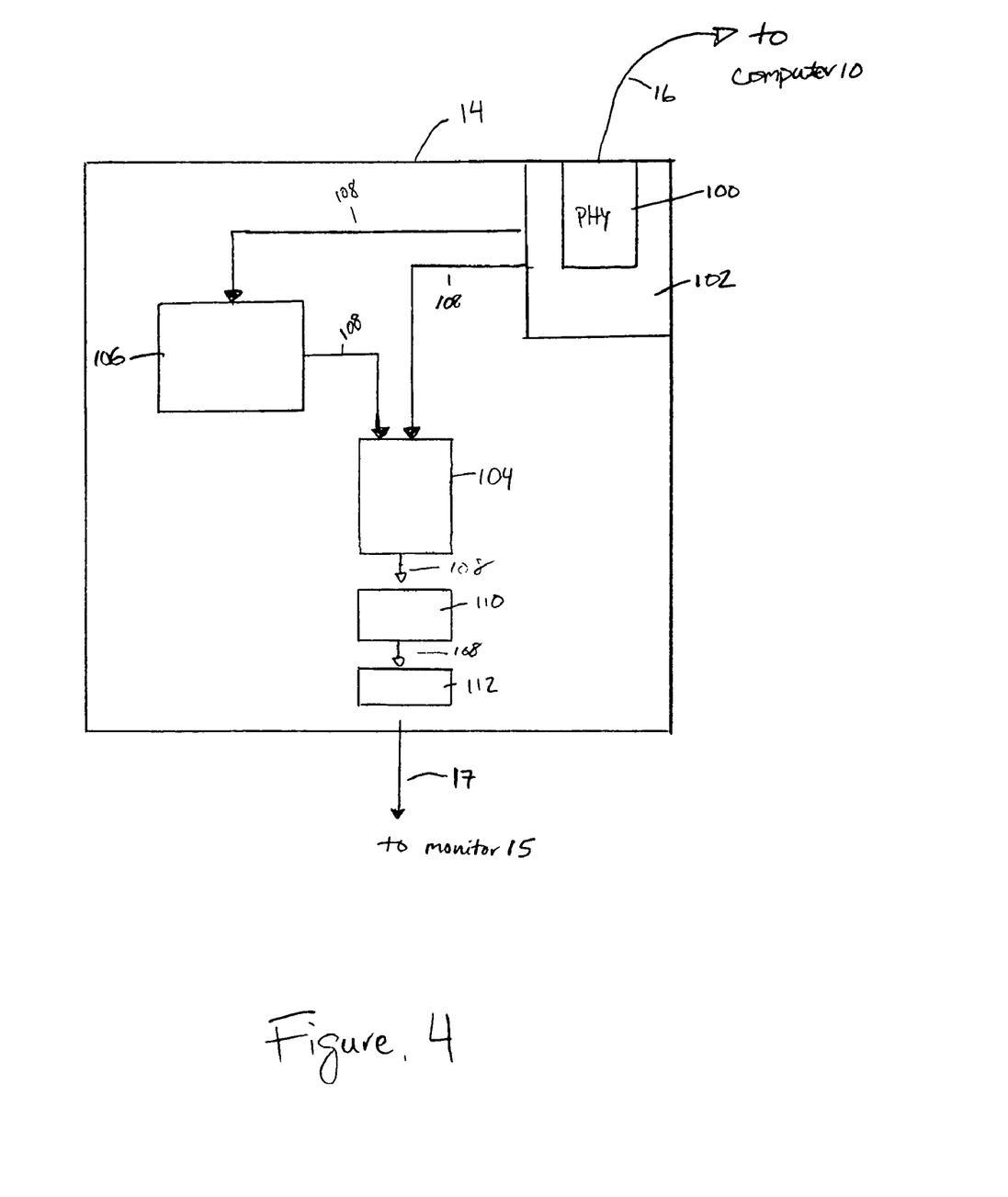
FIG. 4 illustrates a block diagram of the internal components of the video camera.

A block diagram of the internal components within the video camera 14 is shown in FIG. 4. The video camera 14 preferably includes a physical interface circuit 100, an interface circuit 102, a video memory 104, a storage device 106, a video mux and shifters 110, and a video amplifier 112, all coupled together by a conventional bidirectional system bus 108. The IEEE 1394-1995 interface circuit 102 includes the physical interface circuit 100 for sending and receiving communications on the IEEE 1394-1995 serial bus 16. The physical interface circuit 100 is preferably coupled to the computer system 10 (FIG. 2) over the IEEE 1394-1995 serial bus 16. In the preferred embodiment of the present invention, the interface circuit 102 is implemented on an IEEE 1394-1995 interface card within the video camera 14. However, it should be apparent to those skilled in the art that the interface circuit 102 can be implemented within the video camera 14 in any other appropriate manner. The storage device 106 is preferably the tape recording device and assembly by which the video camera 14 records a stream of video data. Alternately, the storage device may include both fixed and removable media using any one or more of magnetic, optical or magneto-optical storage technology or any other available storage technology. The system bus 108 also includes a data bus for transferring data between and among the storage device 106, the video amplifier 112, the video mux and shifters 110, the video memory 104, and the interface circuit 102.

In operation, the interface circuit 102 preferably receives video data and associated data from the computer system 10 (FIG. 2) via the IEEE 1394-1995 serial bus network 16. The physical interface circuit 100 receives both the video data and the associated data. In response to the physical interface circuit 100, the video data is selectively transferred from the interface circuit 100 to one or both the storage device 106 and/or the video memory 104. After the video data is received by the video memory 104, the video multiplex and shifter circuitry 110 and the video amplifier 112 convert pixel data stored in the video memory 104 to RGB signals suitable for use by the display 15 (FIG. 2). The video amplifier 112 preferably transmits the video data to the monitor 15 (FIG. 2) via the RGB cable 17 (FIG. 2).

Figure 5:
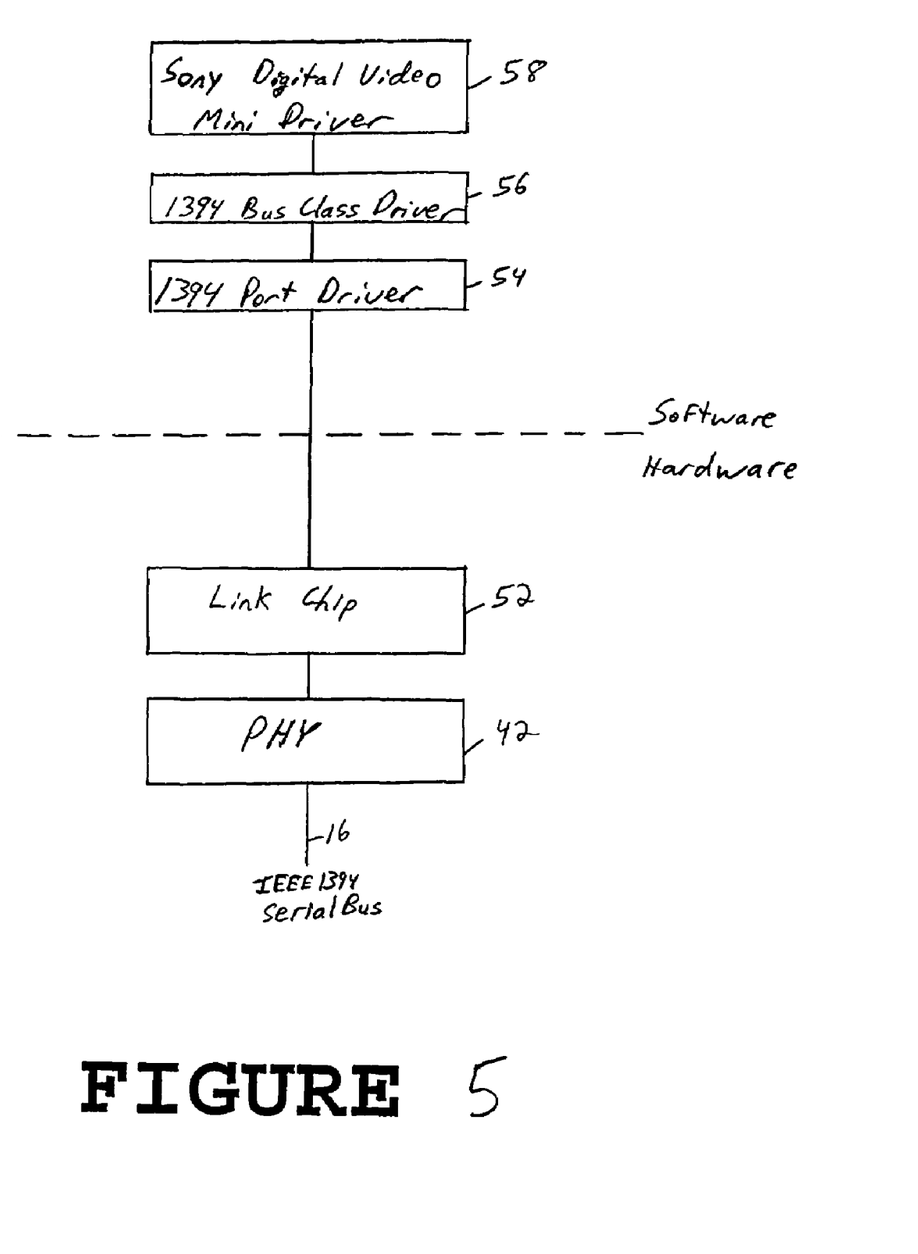
FIG. 5 illustrates a block diagram of the software and hardware structure within the computer system.

A block diagram of the hardware and software architecture of the components and drivers within the computer system 10 for transmitting a video frame is illustrated in FIG. 5. As described above and shown in FIG. 3, the physical transceiver circuit 42 is coupled to the IEEE 1394-1995 serial bus 16 and is responsible for transmitting and receiving communications from the computer system 10 over the IEEE 1394-1995 serial bus network. It should be apparent to those skilled in the art that the present invention can be implemented on any appropriately configured node used to transmit data packets. A link chip 52 is coupled to the physical transceiver circuit 42 for providing data and control signals from device drivers and applications to the physical transceiver circuit 42. The link chip 52 is preferably included within the interface circuit 28. The software applications and device drivers communicate with the link chip 52. The relevant software applications and device drivers for transmitting data from the node over the IEEE 1394-1995 serial bus network include the IEEE 1394-1995 port driver 54, the IEEE 1394-1995 bus class driver 56 and the digital video mini driver 58. The drivers 54, 56 and 58 reside within the operating system and provide the instructions and data necessary to transmit a video frame.

In the preferred embodiment as shown in FIG. 2, the computer system 10 is coupled to the video camera 14 via the IEEE 1394-1995 serial bus 16. Additionally, the video camera 14 is coupled to the monitor 15 via the RGB cable 17. Preferably, the computer system 10 transmits a digital video format video stream which contains video frames and associated data to the video camera 14 via the IEEE 1394-1995 serial bus 16. Each video frame in this video stream contains a time stamp embedded within the frame which instructs the video camera 14 regarding the proper timing to display each frame. Based on this time stamp, the video camera 14 preferably generates the appropriate video signals to reflect the desired frame rate and display each frame at the corresponding display time specified by its time stamp. In this preferred embodiment, the desired frame rate is 29.9700 frames per second. If the frame rate is not exactly 29.9700 frames per second, the resulting picture displayed on the monitor 15 is shown in black and white instead of color.

The computer system 10 preferably transmits the video stream in the form of isochronous packets via the IEEE 1394-1995 serial bus 16 to the video camera 14 over an isochronous channel. In this preferred embodiment, one isochronous packet is transmitted on the isochronous channel in each isochronous cycle. Within an IEEE 1394-1995 serial bus an isochronous cycle occurs every 125 microseconds. Accordingly, an isochronous packet is transmitted on the isochronous channel every 125 microseconds for the preferred embodiment. To assure that the required frame rate of 29.9700 frames per second is met, the following equation (1) is utilized to calculate the necessary number of packets per frame in order to achieve a frame rate of 29.9700 frames per second.

$$\frac{1}{\text{frame rate}} * \frac{1}{\text{cycle time}} = \frac{\text{No. of packets}}{\text{frame}} \quad \text{Equation (1)}$$

With the frame rate at 29.9700 frames per second and the cycle time at 125 microseconds per cycle according to equation (1), the resulting number of packets per frame is 266.9336 packets per frame.

Over the IEEE 1394-1995 serial bus network, only a whole packet can be sent for each isochronous cycle. Accordingly, in order to achieve the result of 266.9336 packets per frame, a ratio of frames containing different numbers of packets is used to achieve an overall average value of 266.9336 packets per frame. A data stream is formed from the frames as they are transmitted from the computer 10 to the video camera 14. In order to achieve the overall average of 266.9336 packets per frame over the course of 10,000 frames, 9336 frames are generated within the computer system 10 containing 267 packets, and 664 frames are generated containing 266 packets. This yields a ratio of fourteen frames containing 267 packets to every one frame containing 266 packets. Further, the computer system 10 generates one frame at a time and selectively generates frames either containing 267 packets or 266 packets based on the ratio of frames containing 267 packets and 266 packets. In this example, the computer system 10 generates fourteen frames containing 267 packets followed by one frame containing 266 packets. The computer system 10 repeats this pattern over the course of 10,000 frames, to achieve the overall frame rate equal to 266.9336 packets per frame. It should be realized by those skilled in the art that the data stream will include more or less than 10,000 frames, and that number is only utilized to illustrate the present invention. These frames are then transmitted to the video camera 14 as an isochronous stream of data via the IEEE 1394-1995 serial bus 16. By transmitting the correct ratio of frames containing different numbers of packets in this isochronous stream of data, the video camera 14 preferably receives the video frame data at the required frame rate of 29.9700 frames per second. This allows the video camera 14 to then transmit the video data to the monitor 15 at the desired frame rate to ensure the proper image quality.

Figure 6:
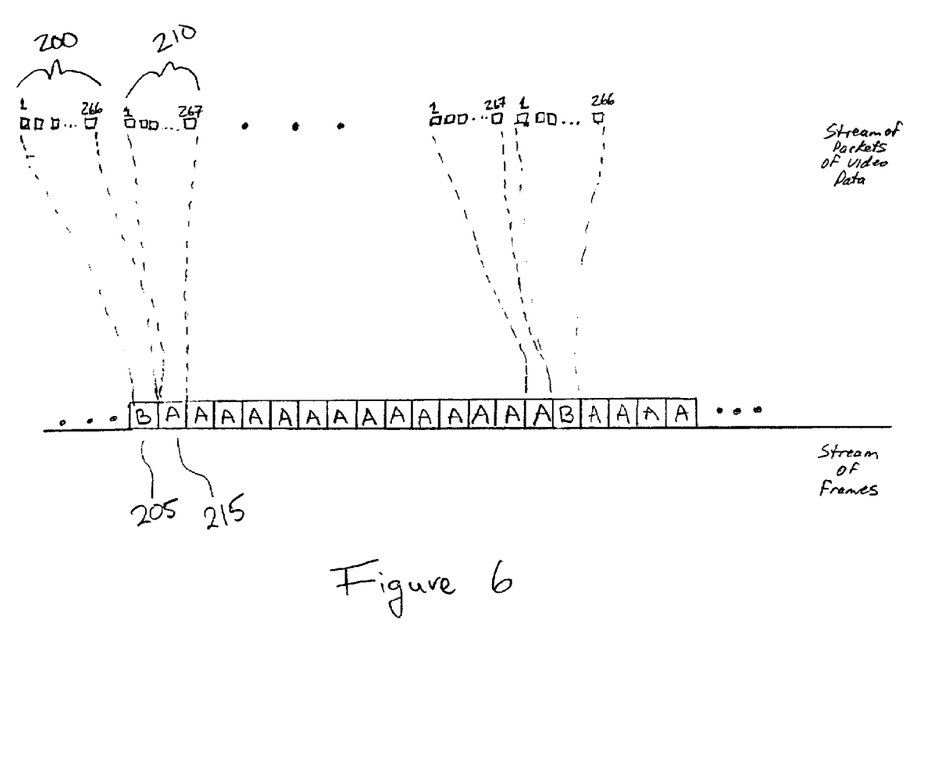
FIG. 6 illustrates a sample isochronous video stream generated by the preferred embodiment of the present invention.

FIG. 6 illustrates a sample isochronous stream of frames configured by the computer system 10 (FIG. 2) for transfer to the video camera 14 (FIG. 2) and a sample stream of packets of video data. The sample isochronous stream of frames includes a first group of frames labeled "A" containing 267 packets in each frame and a second group of frames labeled "B" containing 266 packets in each frame. Over the course of 10,000 frames, the first group of frames (A) includes 9336 frames, and the second group of frames (B) includes 664 frames. As shown in FIG. 6, fourteen frames from the first group of frames (A) are consecutively arranged and are interrupted by one frame from the second group of frames (B). Although not explicitly shown in FIG. 6, this pattern of fourteen frames from the first group of frames (A) interrupted by one frame from the second group of frames (B) continues as long as the data stream is being transmitted.

Further, the computer system 10 places a selective number of packets from the stream of packets within each frame as that particular frame is generated by the computer system 10. For example, 266 packets from the stream of packets formed by a packet group 200 are included within a frame labeled 205. Then, 267 packets from the stream of packets formed by a packet group 210 are included within a frame labeled 215. The packet group 210 consecutively follows the packet group 200 in the stream of packets.

The above example of the preferred embodiment merely illustrates a sample operation of the present invention while utilizing a required frame rate and cycle time specific to the exemplary network illustrated in FIG. 2. It is well within the scope of the present invention to vary the required frame rate and cycle time. Accordingly, different frame rates and/or cycle times will produce a different resulting isochronous stream of data, including a different overall average value of packets per frame.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of transmitting information from a source device at a predetermined rate, the method comprising:
    a. calculating a ratio of first data blocks to second data blocks to achieve the predetermined rate;
    b. forming x number of the first data blocks wherein each of the first data blocks contains n units of data;
    c. forming y number of the second data blocks wherein each of the second data blocks contains m units of data, and further wherein m is not equal to n; and
    d. combining x number of first data blocks and y number of second data blocks into a data stream to achieve the predetermined rate, wherein the first data blocks and the second data blocks are of a same type and have same characteristics and further wherein the x number of first data blocks are evenly distributed among the y number of second data blocks thereby forming a repeating pattern of the first data blocks and the second data blocks within the data stream.

2. The method according to claim 1 further comprising transmitting the data stream from the source device at the predetermined rate.

3. The method according to claim 1 wherein the data stream is digital video data.

4. The method according to claim 1 wherein n, m, x, and y are integer values.

5. The method according to claim 1 wherein the predetermined rate is determined by a receiving device which receives the data stream.

6. A method of transmitting information from a source device to a receiving device, the method comprising:
    a. calculating a ratio of first frames to second frames to achieve a predetermined frame rate;
    b. forming x number of the first frames wherein each of the first frames contains n units of data;
    c. forming y number of the second frames wherein each of the second frames contains m units of data, and further wherein m is not equal to n;
    d. combining x number of the first frames and y number of the second frames into a stream of frames to achieve the predetermined frame rate by evenly distributing the x number of the first frames among the y number of the second frames thereby forming a repeating pattern of the first frames and the second frames within the stream of frames; and
    e. transmitting the stream of frames from the source device to the receiving device;
wherein the first frames and the second frames are of a same type and have same characteristics.

7. The method according to claim 6 wherein n, m, x, and y are integer values.

8. The method according to claim 6 further comprising receiving the stream of frames from the network by the receiver at a predetermined frame rate and wherein the data stream conforms to standards of an IEEE 1394-1995 network.

9. The method according to claim 6 wherein the stream of frames conforms to standards of an IEEE 1394-1995 network.

10. The method according to claim 6 wherein the source device and the receiving device are coupled together within a network.

11. The method according to claim 10 wherein the network is an IEEE 1394-1995 network.

12. The method according to claim 6 wherein the predetermined frame rate is determined by the receiving device.

13. A source device for transmitting information at a predetermined frame rate, the source device comprising a controller for calculating a ratio of first frames to second frames to achieve the predetermined frame rate and generating a data stream containing a plurality of the first frames each including x packets of data and a plurality of the second frames each including y packets of data to achieve the predetermined frame rate, wherein the data stream is transmitted at the predetermined frame rate and y is not equal to x and further wherein the first frames and the second frames are of a same type and have same characteristics and the x number of first data blocks are evenly distributed among the y number of second data blocks thereby forming a repeating pattern of the first frames and the second frames within the data stream.

14. The source device according to claim 13 wherein x and y are integer values.

15. The source device according to claim 13 further comprising an interface coupled to the controller and configured for connecting to a network.

16. The source device according to claim 15 wherein the network is a IEEE 1394-1995 network.

17. The source device according to claim 13 wherein the predetermined rate is determined by a receiving device which receives the data stream.

18. A system for transmitting information at a predetermined frame rate, the system comprising:
    a. a source device for calculating a ratio of first frames to second frames to achieve the predetermined frame rate and generating a data stream containing a plurality of the first frames each including x packets of data and a plurality of the second frames each including y packets of data to achieve the predetermined frame rate and y is not equal to x, wherein the first frames and the second frames are of a same type and have same characteristics and the x number of first data blocks are evenly distributed among the y number of second data blocks thereby forming a repeating pattern of the first frames and the second frames within the data stream; and
    b. a remote receiver coupled to the source device and configured to receive the data stream at the predetermined frame rate.

19. The system according to claim 18 wherein x and y are integer values.

20. The system according to claim 18 wherein the source device is a computer system.

21. The system according to claim 18 wherein the remote receiver is a digital video camera.

22. The system according to claim 18 wherein the predetermined frame rate is 29.97 frames per second.

23. The system according to claim 18 wherein the plurality of first frames are 9336 frames, x packets represent 267 packets, the plurality of second frames are 664 frames, and y packets represent 266 packets.

24. The system according to claim 18 wherein the data stream conforms to standards of an IEEE 1394-1995 network.

25. The system according to claim 18 further comprising a network coupled between the source device and the remote receiver and configured to transmit the data stream.

26. The system according to claim 25 wherein the network is an IEEE 1394-1995 network.

27. The system according to claim 18 wherein the predetermined frame rate is determined by the remote receiver.

28. A system for transmitting information at a predetermined frame rate equal to 29.97 frames per second within an IEEE 1394 network of devices, the system comprising:
  a. a source device for calculating a ratio of first frames to second frames to achieve the predetermined frame rate and generating a data stream containing 9336 first frames, each including 267 packets of data, and 664 second frames, each including 266 packets of data, to achieve the predetermined frame rate of 29.97 frames per second, wherein the first frames and the second frames are of a same type and have same characteristics and the x number of first data blocks are evenly distributed among the y number of second data blocks thereby forming a repeating pattern of first frames and second frames within the data stream; and
  b. a remote receiver coupled to the source device by the IEEE 1394 network of devices, wherein the remote receiver receives the data stream from the source device at the predetermined frame rate.

29. The system according to claim 28 wherein the predetermined frame rate is determined by the remote receiver.

30. A method of transmitting information from a source device to a receiving device over an IEEE 1394 network of devices, the method comprising:
  a. calculating a ratio of first frames to second frames;
  b. forming 9336 first frames wherein each of the first frames contains 267 packets of data;
  c. forming 664 second frames wherein each of the second frames contains 266 packets of data;
  d. combining the 9336 first frames and the 664 second frames into a stream of frames to achieve a predetermined frame rate of 29.97 frames per second by evenly distributing the second frames among the first frames thereby forming a repeating pattern of the first frames and the second frames within the stream of frames; and
  e. transmitting the stream of frames from the source device to the receiving device over the IEEE 1394 network of devices;

wherein the first frames and the second frames are of a same type and have same characteristics.

* * * * *